United States Patent [19]

Wilding et al.

[11] Patent Number: 5,040,941
[45] Date of Patent: Aug. 20, 1991

[54] AUTOMATIC STORAGE SYSTEM

[75] Inventors: Edwin L. Wilding; Mike W. Tyler, both of Louisville, Ky.

[73] Assignee: Griffin & Company, Louisville, Ky.

[21] Appl. No.: 521,270

[22] Filed: May 9, 1990

Related U.S. Application Data

[62] Division of Ser. No. 303,548, Jan. 27, 1989, Pat. No. 4,948,321.

[51] Int. Cl.⁵ .................. B65G 43/08; B65G 47/19; B65G 47/24
[52] U.S. Cl. .................. 414/786; 198/347.3; 198/572; 198/577
[58] Field of Search ............. 198/347.3, 572, 577; 414/786, 294, 295

[56] References Cited

U.S. PATENT DOCUMENTS

| | | | |
|---|---|---|---|
| 1,947,011 | 2/1934 | Karthhäuser | 193/2 R |
| 2,717,703 | 9/1955 | Kull et al. | 414/327 |
| 2,868,395 | 1/1959 | Smith | 198/347.3 |
| 3,297,138 | 1/1967 | McCombie | 198/347.3 |
| 3,355,004 | 11/1967 | Rupert | 198/572 |
| 3,735,881 | 5/1973 | Wilding | 414/786 |
| 3,780,886 | 12/1973 | Allen | 414/295 |
| 3,811,585 | 5/1974 | Wilding | 414/786 |
| 3,877,585 | 4/1975 | Burgess | 414/295 |
| 3,885,683 | 5/1975 | Bornfleth et al. | 414/294 |
| 3,921,853 | 11/1975 | Burgess | 221/1 |
| 3,942,626 | 3/1976 | Wilding | 198/826 |
| 3,952,854 | 4/1976 | Selonke et al. | 198/347.3 |
| 4,138,010 | 2/1979 | Pidgeon et al. | 198/573 |
| 4,212,382 | 7/1980 | Williams | 198/502.2 |
| 4,222,477 | 9/1980 | Molins et al. | 198/347.3 |
| 4,328,886 | 5/1982 | Seragnoli | 198/347.3 |
| 4,336,873 | 6/1982 | Focke | 198/347.3 |
| 4,353,676 | 10/1982 | Mikulich et al. | 414/512 |
| 4,413,640 | 11/1983 | Wahle et al. | 130/281 |
| 4,431,360 | 2/1984 | Maeno | 414/294 |
| 4,574,938 | 3/1986 | Orlandi | 198/347.3 |
| 4,718,541 | 1/1988 | Wilding | 198/699.1 |
| 4,725,181 | 2/1988 | Mine et al. | 414/268 |

FOREIGN PATENT DOCUMENTS

| | | |
|---|---|---|
| 1253165 | 10/1967 | Denmark . |
| 1281946 | 10/1968 | Denmark . |
| 2354263 | 1/1978 | France . |
| 1062911 | 3/1967 | United Kingdom . |
| 2180227 | 3/1987 | United Kingdom . |

Primary Examiner—David H. Brown
Attorney, Agent, or Firm—Wood, Herron & Evans

[57] ABSTRACT

A horizontal storage silo or bin for particulate matter such as, for example, peanuts and cereal, includes a moving apron or floor and a dam for gently receiving product, controlling product deposit into the silo and supporting the rear face of the product pile during discharge to insure a uniform discharge rate throughout the discharge cycle. Full bin storage capacity is utilized. First-in, first-out processing is attained. Various alternative apparatus and methods are disclosed and various product infeed points and bin orientation are accommodated.

14 Claims, 4 Drawing Sheets

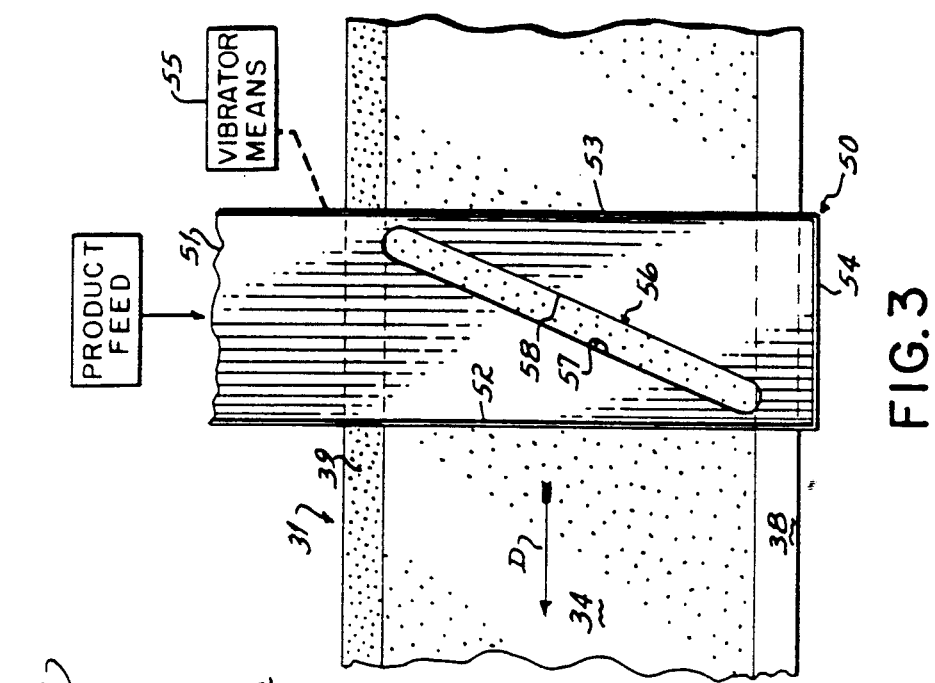
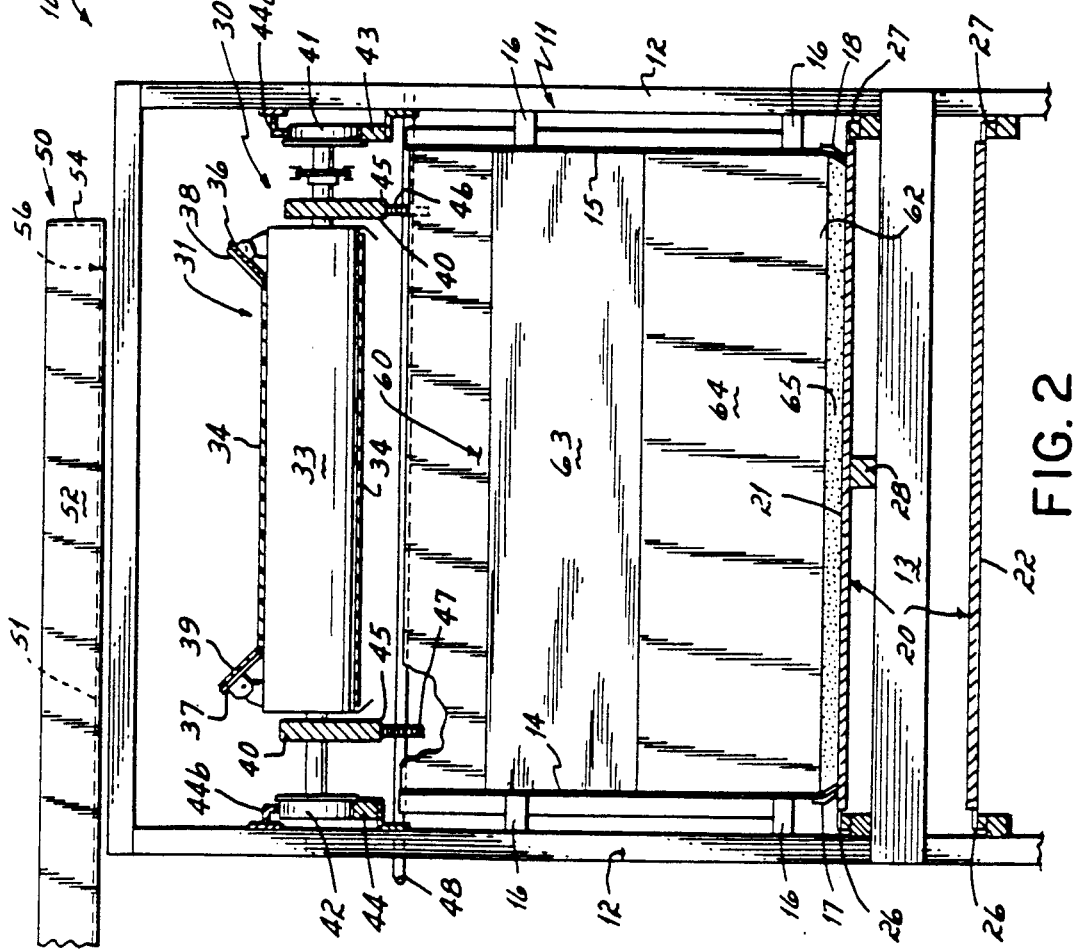

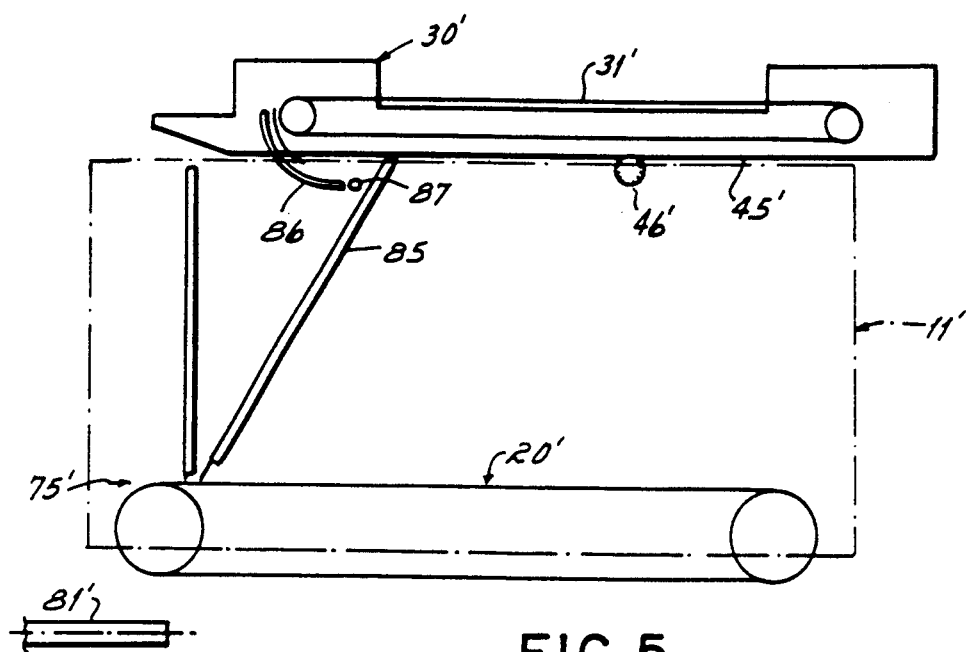
FIG. 5
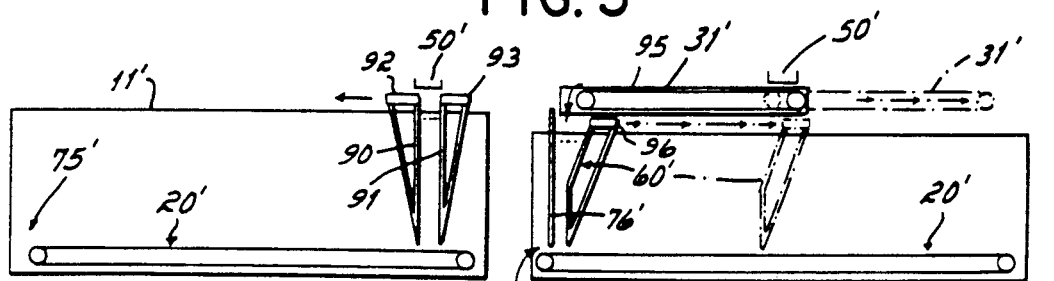
FIG. 6A   FIG. 7A
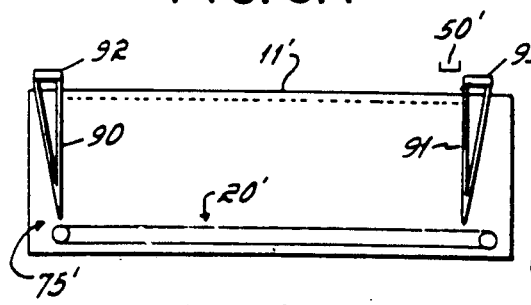 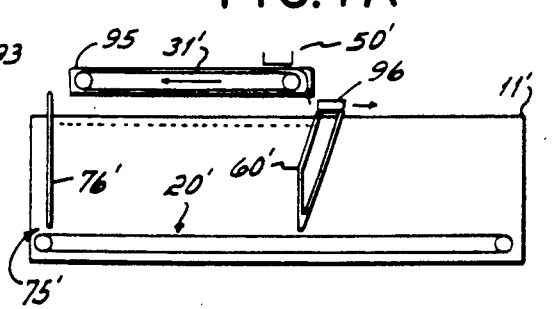
FIG. 6B   FIG. 7B
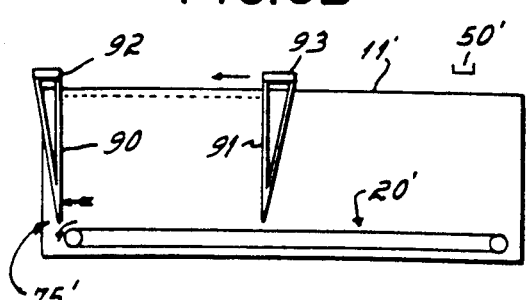 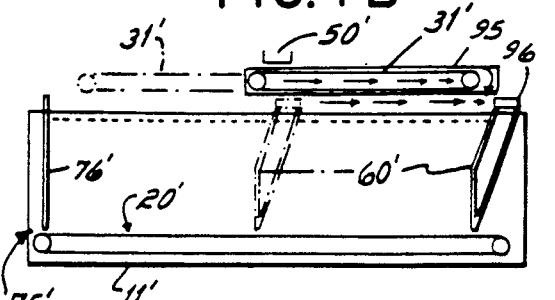
FIG. 6C   FIG. 7C

AUTOMATIC STORAGE SYSTEM

This is a division of application Ser. No. 303,548, now U.S. Pat. No. 4,948,321, filed Jan. 27, 1989.

This invention relates to apparatus and methods for the storage and handling of particulates and more specifically to apparatus and methods for storing and handling fragile, particulate, food products such as peanuts, cereal or the like.

When storing or handling fragile particulate food products such as peanuts, various problems are presented by the inherent nature of the product. For example, if the product is piled too high, the lower product can be crushed by the weight of the pile. If dropped too far into a bin, the products can be shattered or broken on contacting the bin floor or other product.

Moreover, particulate products, such as peanuts or cereal, for example, have a relatively low angle of repose when freely disposed in a pile. In other words, the angle formed between the horizontal, on the one hand, and the tapered surface of a pile of peanuts is relatively low, on the order cf about 10° to 25°. If such particulates are dropped onto an apron or floor in an elongated bin, and allowed to assume their normal angle of repose therein, the space above the reclining forward and rearward pile surfaces is lost to storage use and thus wasted. A larger bin otherwise necessary for a certain volume of product is required.

Thus, while it is desirable to provide for storage of such products in a horizontal bin for several reasons, including reduction of vertical storage height to limit product degradation by crushing or dropping, it is also desirable to maximize the effective horizontal storage volume in a given space for products which normally seek a low angle of repose when piled in unconfined condition.

In another aspect of storing and handling fragile particulate food products, consideration must be given to the desire to generate a uniform product discharge rate from the horizontal storage facility. The natural angle of product repose presents problems here as well.

For example, if products such as peanuts are piled onto a moveable apron or floor in a bin, the forward and rearward end faces of the pile eventually seek their normal angle of repose. Even if the bin has a gate and an end wall, movement of the apron toward a discharge or gate end of the bin eventually moves the pile away from the far end wall. At least the end surface of the pile will then naturally incline, as it recedes away from the end wall, to the normal angle of repose.

When the inclined end of the pile reaches the discharge end, the product will "tail-out", i.e. the amount of product discharging decreases as a function of the inclined pile face. This results in a decreasing volume of discharge near the end of the discharge cycle. Downstream processes or equipment may be affected by the inconsistent product volume discharged by the storage bin. This problem is, of course, duplicated where the forward face of the product pile is also allowed to seek its normal angle of repose prior to discharge.

In still another aspect of particulate product handling, the orientation of the horizontal bin to the location of the product infeed position, at which the product is fed to the bin, or silo also must be considered in view of the existing space for such bins where their installation is desired. While the bin orientation to the filling position may be flexible, it is frequently fixed by preexisting parameters such as existing wall location, with respect to product in-feed points, the need for numerous bins in a small space, and the like. Such fixed orientation may not be suitable or compatible with the storage bin apparatus or function, particularly where the apparatus has been designed in an attempt to overcome the aforementioned problems and must be positioned in a certain way as a result. Such particular structure might limit the possible bin orientation, or demand a particular orientation which would not work due to space limitations in a particular processing facility.

Thus, apparatus accommodating a silo center fill position may not be suitable or workable in a space limiting the process to a silo end filling position, or vice-versa. Also, the necessity of a number of bins in a small area may limit the type of bin or feeding apparatus used.

While it is desirable to overcome these difficulties, it is also desirable to provide apparatus capable of producing a first-in, first-out product discharge capacity. Thus, apparatus solving the aforementioned difficulties should also be capable of producing such operations.

Accordingly, it is desirable to provide a particulate product silo and associated product feeding and discharging components to overcome these difficulties.

Accordingly, it has been one objective of this invention to provide an elongated horizontally disposed particulate product storing and handling apparatus maximizing the volume of product storable in a given volume.

A further objective of the invention has been to provide a horizontal storage apparatus having improved means for gently handling particulate product stored therein and to thereby minimize product damage.

A further objective of the invention has been to provide a horizontal storage bin for particulate product with means to provide a constant product discharge rate therefrom throughout the entire discharge cycle and on a first-in, first-out basis.

A further objective of the invention has been to provide alternate structural means for storing and handling particulate product in an elongated horizontal bin from either center or end fill positions, and to maintain first-in, first-out capability in each situation.

Another objective of the invention has been to provide methods and apparatus for gently storing and handling particulate product in an elongated, horizontal bin, maximizing use of bin volume for storage, producing uniform discharge rates throughout the discharge cycle on a first-in, first-out basis, and minimizing product damage through feeding, storing and discharge.

To these ends, a preferred embodiment of the invention includes a horizontal storage silo or bin having a movable apron or floor, a shuttle, and a shuttle conveyor thereon for receiving product and for dropping product toward the apron, a travelling product receiving and supporting dam mounted on a discharge end of the shuttle for movement therewith and extending downwardly therefrom to the apron, and a gate means at a discharge end of the apron for holding product filling into the bin and for selectively defining a product discharge opening with the apron.

In use, the shuttle's discharge end is disposed over the discharge end of the bin at the discharge end of the apron. The dam is slightly spaced from the gate and product fed on the shuttle conveyor is discharged preferably first onto the dam and then between the gate and the dam. The very first product falls to the apron. Due to the closeness of the dam to the gate, however, (preferably about 2 inches) very little product makes this drop.

When the initial product fill rises near the shuttle, a sensor, such as a photocell, is tripped and the shuttle, with the dam, is indexed rearwardly a small distance. This allows the pile of product between the gate and dam to slump, with further product discharging onto the initial product fill. This filling and indexing continues until the bin is filled, with the product load or pile continually confined vertically by the bin sides, at the discharge end by the gate, and at the rear end by the dam. The product thus fills the bin with only minor settling. Despite minor settling of product between the gate and the dam accepted, the rear end face of the product pile is constantly supported by the dam against slumping or inclining to a rearward angle of repose, so that there is no wasted storage space thereabove.

Air pressure is used to maintain the gate in a locked position during loading. During the discharge cycle, the air pressure is reduced to the minimum pressure required to prevent the weight of the product from opening the gate. The advance of the apron and product thereon provides an additional force against the reduced air pressure. The additional force is sufficient to pivot the gate open to discharge the product. The actual discharge rate is thus controlled by the apron advance speed.

To discharge product, air pressure biasing the gate closed is reduced until the lower portion thereof moves away from the apron a determined distance. Product drops through this opening onto a chute, a conveyor or a container, etc. as desired. The apron is driven toward the discharge or gate end to move the pile of product to the discharge end and to open the gate against its reduced closing bias. At the same time, the shuttle is driven toward the discharge end at a corresponding rate. The dam supports the rear end or face of the product, preventing it from slumping to an angle of repose. This movement is coordinated with the apron until the product discharge is completed, or until it is desired to resume filling.

Such filling, which could be carried out simultaneously with product discharge, if desired, at suitable fill rates and with dam movement in an appropriate direction to produce consistent product fill and supported end configuration at the dam. For example, if filling is desired simultaneously with discharge, the dam is maintained in a position to support the rear end of the product pile in a vertical configuration. While the apron is moved to continue the discharge, the dam and shuttle may remain stationary or move with or in an opposite direction to the apron, depending on the relative position of the components, the discharge rate and the infeed rate, and as necessary to maintain product end support.

In order to promote gentle product transfer from the shuttle to the product fill in the bin, the dam is inclined with its bottom further forwardly near the apron than at its top at the shuttle. The dam's upper surface is slightly inclined for receiving product from the shuttle, and a second further inclined surface further slows the product. A third dam surface is generally vertically disposed. Preferably, the product is dropped onto the inclined dam faces so its vertical free fall is reduced to the distance between the shuttle conveyor and the dam face at the upper end and from the lower edge of the second inclined face to the apron at its lower end. The product thus does not fall vertically all the way to the apron, even upon initial filling.

Also, it will be appreciated that after initial product is deposited, product fall is limited by virtue of the process of dropping product onto the prior fill and thereafter permitting the fill to slump, rather than drop, against the receding dam face. Product degradation is thus effectively minimized.

Accordingly, it will be appreciated that the preferred embodiment includes, among other things, a traveling dam having numerous selective movements including backing up upon normal filling with the in feed shuttle, forward motion with the apron upon product discharge, and when the apparatus is controlled to fill while discharging, moving in the direction necessary to maintain its desired support of the end face of the load. In other words, the dam rate and direction is responsive to these modes or inputs, with any appropriate product sensors being used to sense and control maintenance of the proper fill by dam movement rate and direction.

Other advantages and certain modifications of the invention will be readily appreciated from the following detailed description of the preferred and certain alternative embodiments of the invention and from the drawings in which:

FIG. 2 is a diagrammatic cross-sectional view taken along lines 2—2 of FIG. 1;

FIG. 3 is a diagrammatic plan view of the infeed apparatus taken along lines 3—3 of FIG. 1;

FIG. 5 is a view similar to FIG. 1 illustrating an alternative dam and product chute;

FIG. 6A is a diagrammatic side elevational view illustrating an alternative embodiment of the invention accommodating an end filling procedure;

FIG. 6B is a diagrammatic side elevational view similar to FIG. 6A illustrating product filling;

FIG. 6C is a diagrammatic side elevational view similar to FIG. 6A illustrating product discharge;

FIG. 7A is a diagrammatic side elevational view illustrating filling of the first portion of silo in a second alternate embodiment of the invention;

FIG. 7B is a view similar to FIG. 7A but showing the filling of a second silo portion;

FIG. 7C is a view similar to FIG. 7A but illustrating bin discharge.

Figure 1:
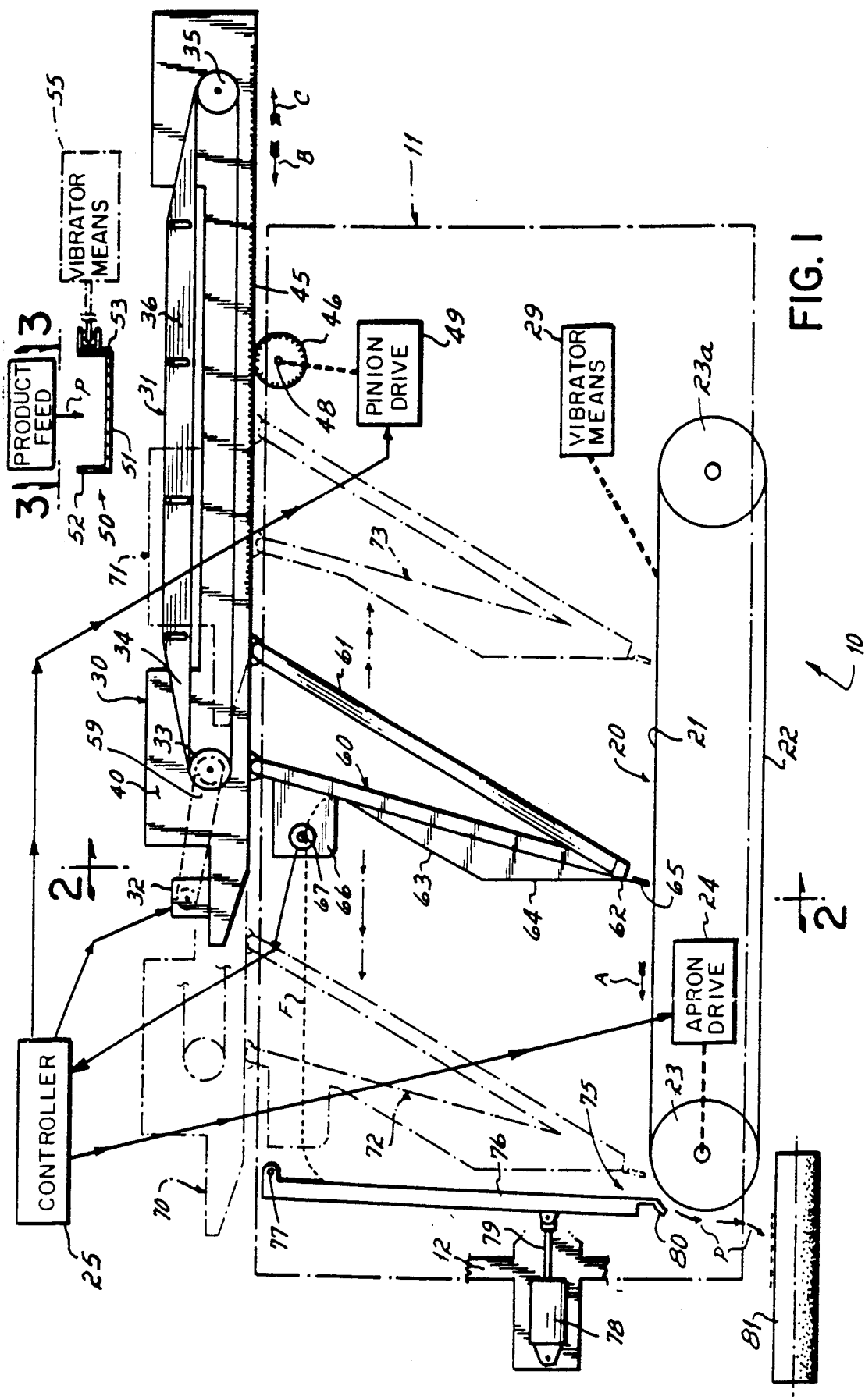
FIG. 1 is a diagrammatic elevational side view of a preferred embodiment of the invention.

Turning now to the drawings, FIG. 1 thereof diagrammatically illustrates a preferred embodiment 10 of the invention. As will be illustrated and described, the invention includes an elongated, horizontal silo or bin 11 for receiving, storing and transporting fragile particulate food product such as peanuts or cereal. While the preferred embodiment will be described in connection with application for such products, it will be appreciated that the invention might be utilized with any fragile particulate product of similar size.

FIGS. 1, 2 and 3 illustrate various details of the particular preferred embodiment 10. Referring to FIG. 2, it will be appreciated that the bin or silo 11 includes a plurality of frame members 12, 13 and elongated side walls 14 and 15. These walls form the actual elongated side walls contacting and supporting any particular product within the bin 11. Appropriate fittings 16 are secured to the side walls 14, 15 to mount them on the frame members 12 such that the interior surface of the side walls can remain smooth with no fastener projections. The bottoms of the side walls are provided with resilient seals flanges 17, 18 as will be discussed.

A slat conveyor or apron 20 is disposed at the bottom of the bin and extends therealong beneath the side walls 14 and 15. The slat conveyor 20 includes an upper run 21 and a lower run 22 with the upper run defining a floor for the bin 11. The seal 17 and 18 extend from the bottom of the side walls 14 and 15, respectively, to engagement with the upper run 21 of apron 20. This prevents product leakage between the bottom of the side walls 14 and 15 and apron 20.

The apron 20 as noted preferably comprises a slat conveyor of any suitable form. One such slat conveyor is shown in U.S. Pat No. 4,718,541, incorporated herein by reference in its entirety. Preferably, such a slat conveyor is constructed so that the respective abutting edges of the slats slidably engage, or are held so close together during their movement that no product can fall therebetween. The slat conveyor or apron 20 includes a drive pulley 23 and an end pulley 23a at the other end thereof. These pulleys 23, 23a are appropriately supported by any suitable means on the frame 12, 13 of the bin 11. The apron 20 is also provided with an apron drive 24, which is controlled by a controller 25, for example, to move the upper run 21 of apron 20 in the direction as shown by the arrow A in FIG. 1.

As illustrated in FIG. 2, the ends 26 and 27 of the apron slats may be slidably mounted on the frame 12 for support throughout the upper and lower runs 21, 22, while the center of the slats, forming the upper conveyor run 21, may be supported by a centralized slide or roller members 28. The slat conveyor or apron 20 may also be operably connected to a vibrator means 29 for vibrating the slat conveyor to cause settling or other desirable movement of the product thereon, such as motivating the product, for example, where such motivation may be used in a discharge cycle.

The bin is open at the tops of the side walls 14, 15. Disposed thereabove is a shuttle 30. A channel belt conveyor 31 is disposed thereon. Channel belt conveyor 31 includes a conveyor drive 32 operably connected to a drive pulley 33 about which a flexible belt 34 is entrained. Drive 32 could be located at the opposite end of the conveyor 31, if desired, to mount it at a position that is not directly over the product. The channel belt conveyor drive 32 is operably connected to the controller 25 for energization of the channel belt 34 as will be described. The belt 34 extends around the pulley 35 and side supports 36, 37 are angled upwardly to support the marginal edges 38, 39 of the belt 34 in an upward fashion to help maintain product thereon. While any suitable such channel belt conveyor 31 could be utilized, further details of a channel belt conveyor of the general type discussed above are shown in U.S. Pat. No. 3,942,626, incorporated herein by reference, in its entirety. Moreover, it should be appreciated that other forms or types of conveyors could be used. One such conveyor is a "sidewall" conveyor wherein a conveyor belt is provided with upwardly extending sidewalls to contain the product.

Shuttle 30 includes a shuttle frame 40 supported by means of wheels 41, 42 (FIG. 2) riding on tracks 43, 44 supported by the frame 12. Mounted above the respective wheels 41, 42 are hold down rails 44a and 44b. These prevent the shuttle from raising upwardly as will be described.

The bottom edges of the shuttle frame 40 are provided with racks 45. A pair of pinions 46 and 47 is mounted on a shaft 48 operably connected to a pinion drive 49. Drive 49 is also controlled by controller 25. The pinions 46, 47 engage respective racks 45 on the bottom of the shuttle frame members 40. When the pinions are rotated, they drive the shuttle 30 in the direction of arrow B or C depending on the rotation of the pinion drive. A product feed conveyor 50 is disposed above the channel belt conveyor 31 and includes a trough 51 having sides 52, 53 and an end wall 54. The trough 51 is connected to a vibrator means 55 for conveying product along the trough. Other forms or types of cross feeders could be used.

The trough 51 is provided with a slot 56 angled across the trough as shown in FIG. 3. The slot has a forward edge 57 and a rearward edge 58.

In use, the product is fed from a product infeed location (shown near the rear end of bin 11) onto the trough 51 which is vibrated by vibrator means 55 so as to carry the product toward the slot 56. The product generally extends across the trough 51 between the side walls 52 and 53. As it reaches the edge 57, it is dropped through the slot onto the channel belt 34. As a result of the angulation of the slot 56, the product is evenly disposed across the belt 34 which is energized in a feeding mode, in the direction of arrow D, toward a discharge end 59 of the channel belt conveyor 31.

As perhaps best seen in FIGS. 1 and 2, a travelling dam inclined 60 is secured to the bottom of the shuttle frame 40. A brace 61 is also secured to the shuttle frame 40 and to the lower end 62 of the dam. The dam face has an upper inclined portion, a second inclined surface 63 and another vertical surface or portion 64 extending downwardly from an edge of the second inclined surface. The dam generally extends transversely between the side walls 14 and 15 of the bin 11. Preferably, the first and second portions of the dam face are inclined such that product dropped thereon is received gently at a low angle of incidence, for example, on the order of about 10° to about 15°. Alternatively, surface 63 may be inclined even further, to about 20° to 30° from the horizontal in order to enhance the slump characteristics of the particular product to be handled. The bottom of the dam 60 may be provided with a resilient seal 65 for engagement with the upper run 21 of apron 20.

Brackets 66 are mounted on either the shuttle frame 40 or as shown in FIG. 1, on the dam 60. A product sensor 67 is supported by the brackets 66. The sensor is electrically connected to the controller 25 for sensing the product reaching a height within the bin corresponding to that of the sensor's disposition. Any suitable sensor, such as a photocell, can be used.

As shown in FIG. 1, it will be appreciated that several of the various shuttle and dam positions are shown in the phantom lines. For example, phantom lines 70 illustrate a forwardmost position of the shuttle corresponding to its position when filling of the bin 11 is initiated. On the other hand, phantom lines 71 indicate the position of the shuttle 30 when the shuttle and the dam 60 have moved rearwardly after filling of the substantial portion of the bin. The solid lines in FIG. 1 show the shuttle and dam in an intermediate position between ends of the bin 11.

Moreover, phantom lines 72 indicate the forward most position of the dam and its brace, corresponding to shuttle position 70, while the phantom lines 73 indicate a more rearward position thereof corresponding to shuttle position 71.

It will also be appreciated at this point that the lines 11 only diagrammatically show the outline of the overall bin 11. The elongated side walls 14, 15 extend from a point near the forward or discharge end 75 of the bin to a point at least rearwardly beyond the rearwardmost position of the dam 60 when the shuttle has been fully reciprocated in the direction of arrow C to its end most point.

Returning attention momentarily to the discharge end 75 of the bin 11, as shown in FIG. 1, it will be appreciated that a gate 76 is pivoted at 77 to the frame members 12. An air cylinder 78 is also secured to the frame 12 and has an extensible actuating member 79 secured to a lower portion of the gate 76. Air pressure is introduced to the cylinder via a control means, such as at 25, at a level to hold the gate closed. For discharge, the air pressure is reduced to the minimum pressure necessary to hold the gate closed against the weight of the product. When the air pressure is so reduced, the cylinder functions as a spring, permitting the gate to open away from apron 20 and allowing product to be discharged. This motion is produced by the force exerted on the gate by the product as the apron moves forward. The gate 76 is provided with a lower end seal 80 for engaging the apron 20 at its discharge end to seal off any discharge until the gate is opened. Finally, it will also be appreciated that a conveyor 81 is located beneath the discharge end 75 of the bin 11 for receiving any product discharged from the apron 20 and for conveying the product to further storage processing or packaging. Chutes, containers or other means could be disposed beneath the discharge end 75 of the bin 11 for receiving product discharge therefrom.

Alternate Dam

Turning now momentarily to FIG. 5, there is disclosed therein an alternative dam construction 85 disposed in operative relationship with a product chute 86. For purposes of description of this alternative dam and chute embodiment, parts which are similar to the preferred embodiment 10 are referred with similar numbers as those used in the foregoing description, but with a prime (') added. While it has not been found necessary in the handling of peanuts, in the preferred embodiment, it may be desirable to even further limit any dropping of the product from a channel belt conveyor 31' into a bin. In this regard, the chute 86 in mounted to a shuttle 30' and, as shown in FIG. 5, is curved in a reverse direction to a position closely adjacent the inclined dam 85. When the belt conveyor 31' is energized to the left (as viewed in FIG. 5) product on that belt is dropped off the end of the conveyor and engages chute 86 in a sliding fashion. The product then slides down the chute to engagement with the dam 85. When the product falls from the end of the chute, it only has several inches to drop before it engages the inclined dam 85. The product then slides down the dam to the top end of any fill. A sensor 87 may be located just below the lower end of the chute 86 in order to indicate when the bin has been filled to that point so that the shuttle can be indexed as will be described herein.

Operation of Preferred Embodiment

Figure 4A:
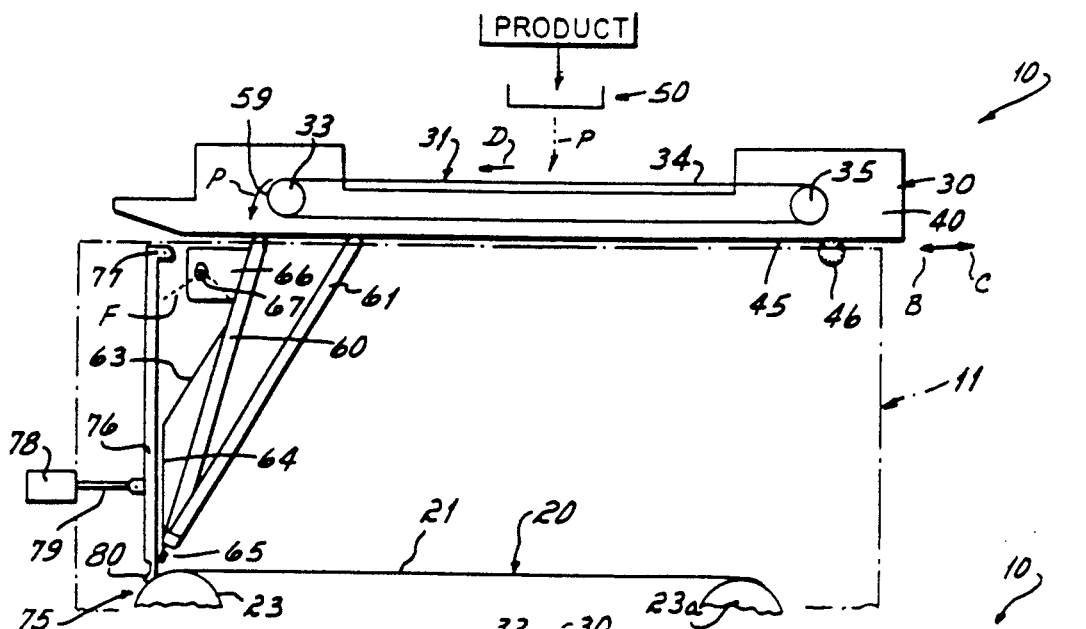
FIG. 4A is an elevational side view similar to FIG. 1 illustrating initial product filling in the preferred embodiment.
Figure 4B:
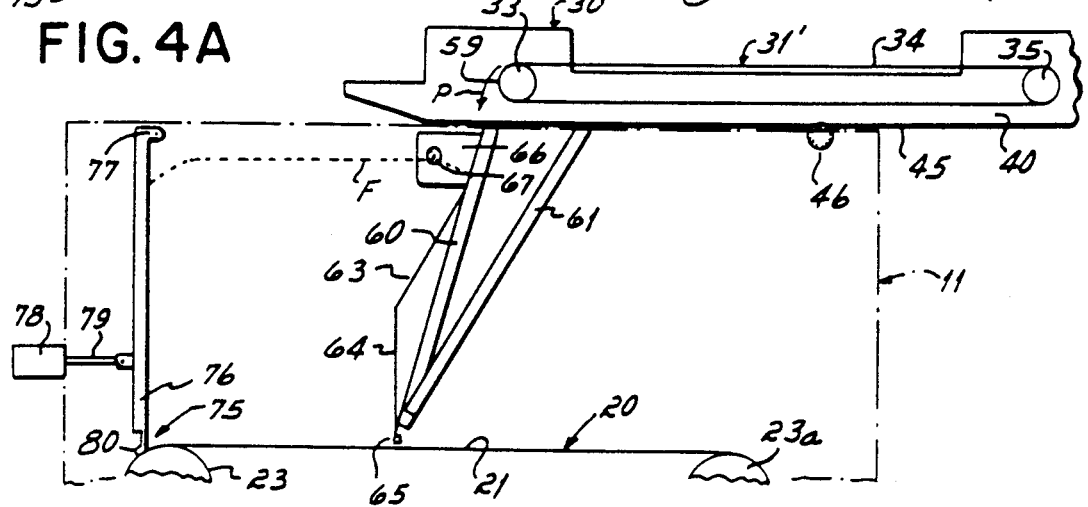
FIG. 4B is an elevational side view similar to FIG. 1 illustrating intermediate filling of product.
Figure 4C:
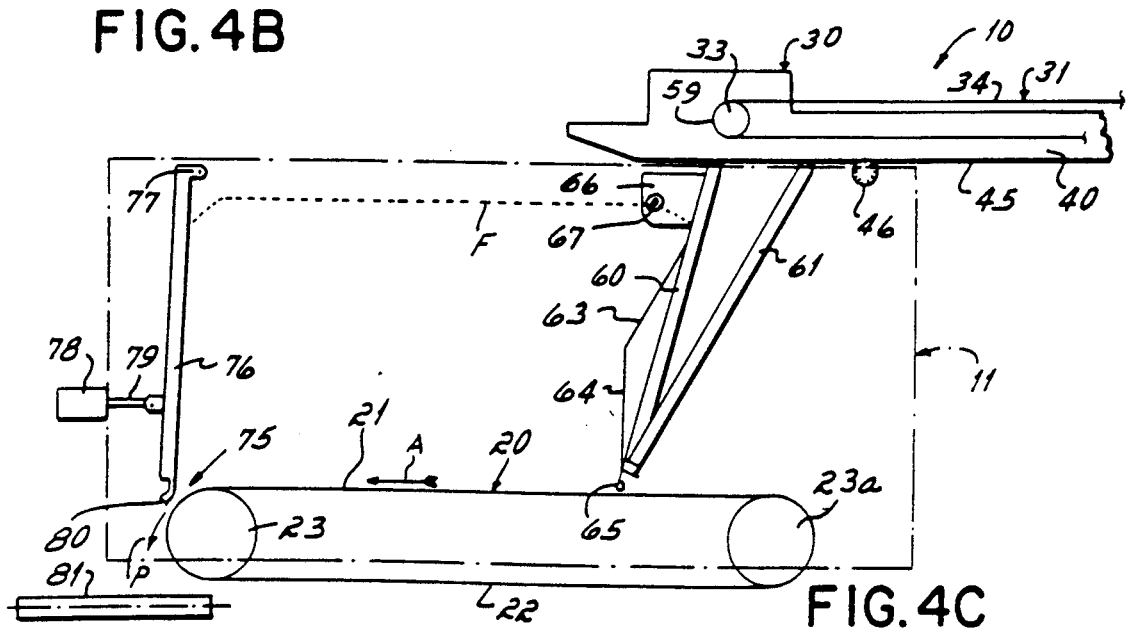
FIG. 4C is an elevational side view similar to FIG. 1 illustrating discharge of product.

Referring now to FIGS. 4A through 4C, operation of the preferred embodiment 10 of the invention will now be illustrated. Referring first to FIG. 4A, the shuttle 30 is moved in the direction of arrow B to its forwardmost position. In this position, the dam 60 and the dam faces 63 and 64 are located very close to the gate 76. Product is fed to the product feed conveyor 50 and falls onto the channel belt 31 which is driven in the direction of arrow D. Product P falls from the discharge end 59 of the channel belt conveyor 31 onto the inclined face of the dam 60, where the product gently engages the face of the dam and slides downwardly onto the tapered face 63. From there the product then fills between the vertical face 64 and the vertical gate 76 onto the upper run 21 of the apron 20. It will be appreciated that the space between the gate 76 and the lower face 64 of the dam 60 is small preferably about 2 inches wide so that a very small amount of the product falls vertically from dam face 63 into the space onto the apron. Moreover, this limited space minimizes the weight of the product falling on top of the first product to engage the apron, thereby further minimizing any damage to the lower product. Also, it will be appreciated that the product has a vertical fall onto the apron, only from the apex of the joint between the surfaces 63 and 64 further minimizing any free fall onto the hard apron. Thereafter, the product begins to fill up toward the dotted line F, shown in FIG. 4A, indicating the upper surface of the product fill. When the product reaches a height correlated to that of the sensor 67, the sensor generates a signal to the controller. The controller energizes the pinion drive 49 to index the shuttle 30 rearwardly, in the direction of arrow C as indicated in FIG. 4A. It will be appreciated that the shuttle moves incrementally toward its position as shown in next FIG. 4B. While the shuttle could be moved continuously and slowly, it is believed preferable to step it sequentially a predetermined small linear distance such as about 1 or 2 inches. When the shuttle 30 is indexed in the direction of the arrow C, incrementally, the product load in the bin will take on the general configuration, for example, as shown by the dotted lines F in FIG. 4B, where the apex of the deposited product pile is just under the sensor and the trailing edge of the product pile has slumped as a result of the rearward movement of the dam 60. Filling thus continues in the new indexed position until the apex of the pile again reaches the sensor. The shuttle is then further indexed in the direction of arrow C and so on until the entire bin has been filled.

In this manner, it will be appreciated that once the initial product has engaged the apron 20, as illustrated in FIG. 4A, no other product is dropped from the channel belt 31 directly to the apron. All of the product is dropped onto the inclined dam where it slides down to the top of the prior product fill. Thereafter, as the shuttle and dam are indexed rearwardly, the rearward face of the product fill is permitted to slump against the dam so that any initial product drop is only onto the top of the product fill and not all the way to the apron. The product fill is simply allowed to slump and settle on the apron as the dam is indexed rearwardly or in the direction of arrow C. The area vacated by the slumping product is refilled, and so on until a relatively level fill is produced along the length of the bin.

Once the bin is completely filled, it will be appreciated that the product filled into the bin between the side walls 14, 15 has a relatively level manner top surface with no wasted or unfilled space. The gate 76 has maintained the forward face of the product in a general vertical orientation and the forward face of the product pile is not permitted to slump to its natural angle of repose. Moreover, the dam 60 has maintained the rearward face of the product fill in a generally vertical orientation and it has not been allowed to slump to its normal angle of repose.

When it is desired to discharge product from the bin, the controller is actuated to release pressure exerted by the air cylinder 78 on the gate 76. This is a proportional control so that the gate can be urged slightly to the left, as viewed in FIGS. 4A through 4C, to create a space between the lower end of the gate and the apron 20. This movement of the gate is thus caused both by relaxation of the pressure bias on the gate by means of the air cylinder 78, and by the force of the product fill exerted on the gate, both by weight of the product and by movement of the apron 20 in the direction of arrow A. Such movement is initiated by a controller signal to the apron drive 24.

Accordingly, product P falls from the discharge end 75 of the bin off the apron 20 onto the conveyor 81 for further transfer.

At the same time, it will be appreciated that the shuttle 30 is driven in response to a signal from the controller 25 to the pinion drive 49 in the direction of arrow B. The dam 60 thus is forced to follow and support the end of the product fill such that the rearward face of the product is never permitted to slump to its normal angle of repose, even though the product fill as a whole recedes away from the right hand end of the bin as the bin is discharged. The hold down rails 44a and 44b (FIG. 2) serve to hold the shuttle 30 and racks 45 down on pinions 46, 47 against the drive pressure placed by dam 60 on the product. Accordingly, as result of the controlled and selected velocity or indexing of the apron 20 with the coordinated movement of the shuttle 30 and in dam 60, the entire product fill is urged to the discharge end 75 of the bin. Once the shuttle 30 reaches its endmost position, such as that shown in FIG. 4A, it will be appreciated that the discharge of the product is maintained consistent all the way to the last product discharged from the apron 20. Without this movement of the dam, for example, the rear end of the product fill would slump to its natural angle of repose and, as the discharge of the apron continued, the product discharge would be drawn from selectively lower heights of the reclining product fill. The product would tend to "tail out" at the end of the discharge cycle. The preferred embodiment described above operates in a quite different way and provides a constant product discharge rate throughout the entire discharge cycle.

It should also be appreciated that it is possible to simultaneously fill the bin 11 while discharging. For example, in the position of the apparatus shown in FIG. 4B, it would be possible to operate the cylinder 78 and the apron 20 to move in the direction of arrow A, such that the gate 76 is open and the product begins to discharge. The dam 60 during this time still provides relatively vertical support for the rear face of the product fill in the bin. Nevertheless, depending on the rate of the product feeding into the bin from the channel belt conveyor 31, the shuttle 30 could be moved in either direction, toward the left or right as viewed in FIG. 4B, to maintain support of the uniform product fill. Thus depending on the infeed rate and the relative discharge rate, the shuttle 30 could be moved to the left or the right in order to maintain support of the rear face of the product fill and to accept new product while the bin is discharging. More particularly, and for example, for a given apron speed, discharge opening and volumetric infeed rate, the dam might remain stationary with apron motion being sufficient to cause slight slumping of the rear end of the fill to accept new product. A faster apron speed or discharge rate might require forward dam motion to maintain product support while a slower discharge rate may require rearward dam motion to accommodate the new product. Such control can be programmed into the controller in any suitable and well known manner. Accordingly, the apparatus can provide continuous uniform product discharge rate simultaneously with bin filling.

First Alternative Embodiment

Attention is now directed to FIGS. 6A through 6C wherein an alternative embodiment of the invention is diagrammatically illustrated. In this embodiment, elements similar to those of the preferred embodiment are indicated with similar numbers primed. The bin 11' is provided with an apron 20' defining the floor of the bin. An infeed position, defined by the trough 50', is disposed at the right hand end of the bin. Thus, this embodiment is useful in accommodating end feed parameters. Respective dams 90 and 91 are mounted on respective independent carriers 92 and 93, each of which is mounted for reciprocal movement to the right or left as viewed in FIG. 6A through 6C. This can be accomplished by providing a drive pinion on the respective carriers and driving them along a rack located on the upper end of the bin (shown only in FIG. 6C for clarity), or by pulling the travelling carriers by means of respective cables or the like, or by any other suitable drive means. Of course, each of the dams 90 and 91 is provided with bottom seals (not shown) to seal the dam in sliding relation with apron 20. Also, each dam 90, 91 could be provided with respective tapered services so as to reduce the vertical fall of any initial product deposited onto the apron 20'. Nevertheless, in this configuration, it will be appreciated that the carriers 92, 93 are initially disposed at the right hand end of the silo opposite the discharge end 75'. When filling has begun, product is discharged from a product infeed 50' between the dams 90 and 91. A sensor (not shown) may be provided in conjunction with the carrier 92 and/or 93 such that when the product is filled to a predetermine height, the carrier 92 is indexed to the left as viewed in FIG. 6A. Also at the same time, the apron 20' may be driven to the left as viewed in 6A. This permits the product fill to slump between the dams 90 and 91 to accommodate further product dropped from the product feed conveyor to the top of the previous fill. This incremental indexing of the carrier 92 and apron 20' continues until the bin has been filled from its rearward end as indicated in FIG. 6B.

The disposition of the sensor and the incremental motion of the dam 90 and apron 20' is controlled such that when the fill is completed, the fill is relatively level on top of the apron 20 with the end faces of the fill being supported in a substantially vertical condition between the dams 90 and 91. When it is desired to discharge the bin 11', the product feed from the product infeed 50' is discontinued. The carrier 92 and the dam 90 are then operated as a gate, and the dam is pivoted or indexed to a point where there is a predetermined space between the lower end of the dam 90 and apron 20'. The apron 20' is indexed simultaneously with the shuttle 93 to the left (FIG. 6C) so the product is discharged from the apron 20' at the discharge end 75'. This motion continues until discharging has been completed.

When discharging is completed, the two carriers 92, 93 are moved back to the right to the position shown in FIG. 6A for further filling. As noted, this embodiment accommodates an end product feed position. In other words, in situations where the product is fed into the area which the bin will be located at a position so that it can only be introduced into the bin at one end thereof, this embodiment would accommodate the total filling of the silo from any end position and still provide the desirable product fill support throughout the entire discharge cycle so that the product does not tail out toward the end of that cycle. Moreover, it will be appreciated that there is no elongated shuttle which extends beyond the ends of the bin 11' in this embodiment. Also, it will be appreciated that the discharge process of first-in, first-out is obtained.

Second Alternative Embodiment

A second alternative embodiment as shown in FIG. 7A through 7C. In this embodiment, a center feed 50' is disposed over a shuttle 95 carrying with it the channel belt conveyor 31' similar to that of the preferred embodiment, except reversible. A gate 76' is provided at the discharge end 75' of the bin 11'. A dam 60' is mounted on a carriage 96 disposed for movement along the bin 11' independently of shuttle 95.

The particular configuration shown in FIGS. 7A to 7C is useful in a case where there is no room or space to have the shuttle 95 extend beyond the end of the bins 11'. This is useful in situations where bins are located against a wall, or where it is desirable group a number of bins in an end-to-end configuration. Accordingly, this embodiment contemplates the filling of the first half of the silo by movement of the shuttle 95 and channel belt 31' in one direction and thereafter the filling of a second half of the silo after the shuttle has been repositioned and the channel belt 31' reversed.

Accordingly, referring to FIG. 7A, it will be appreciated that the shuttle 95 is initially positioned near the discharge end 75' of bin 11'. The product is fed by the product feed conveyor 50' onto the channel belt conveyor 31' and is dropped onto the dam 60' and into the bin 11' as discussed above with respect to the preferred embodiment. Once product reaches a fill sensor on carrier 96, the shuttle 95 and the carrier 96/dam 60' are indexed incrementally rearwardly, or to the right, and so on, until the first half of the silo is filled. This position is shown in phantom lines in FIG. 7A.

At this time, the shuttle 95 and channel belt conveyor 31' are stopped. The shuttle 95 is reversed by repositioning means RM to its initial beginning position as shown in FIG. 7B. The shuttle 96 is. indexed slightly rearwardly and the channel belt conveyor 31' is reversed to begin moving product in a reverse direction on that belt and again depositing it onto the rearwardly indexing dam 60' disposed now under the opposite end of the shuttle. This continues with the shuttle 95 and the channel belt conveyor moving 31' and indexing to the right hand or rear end of the bin as shown in FIG. 7C until the bin is filled.

When it is desired to discharge the bin, the apron 20' is moved to the left in conjunction with operation of the gate 76' to begin discharging product at the same time the carrier 96 and dam 60' are moved to the left in order to support the rearward face of the discharging fill (in the same manner as the dam 60 as described above with respect to the preferred embodiment). It will thus be appreciated that the gentle handling of the product is obtained in a center fed configuration while at the same time the uniform product discharge is also obtained and it is not necessary to extend any shuttle beyond the confines of the ends of the bin 11', thus accommodating many particularly cramped spacing configuration.

Accordingly, it will be appreciated in each of the embodiments described above, that the first product discharged into the bin is the first product to be discharged from the bin. At the same time, it will be appreciated that the various embodiments provide various filling and discharge capabilities, together with various bin orientation capabilities such that the desired parameters of first-in, first-out and gentle handling of the product, together with uniform discharge rate throughout the discharge cycle are obtained. Moreover, these benefits can be obtained for various locations of the respective bins with respect to the product infeed points to accommodate a number of fixed facility parameters such as locations of walls, bin spacing product infeed locations and the like. Moreover, it will be appreciated in each embodiment that the storage area of each bin is maximized and there is no wasted space which would otherwise be generated if the product fill were allowed to slump to its natural angle of repose.

While the invention has been described primarily for use with products where the apron-forced discharge is preferred, the invention can be used to handle extremely fragile products, such as cheese puffs. In the discharge of such fragile product, any pressure exerted by the apron on the product toward the gate would tend to crush the product. Accordingly, when discharging such highly fragile product, the product is allowed to seek its natural angle of repose at the discharging face. Linear apron movement or vibrating apron movement moves the inclined product pile toward a metered opening where the product is discharged or dropped therethrough. The opening and the conveying rate could be adjusted in this instance to produce a desired discharge rate. Of course, the following dam could still be used to support and maintain the rear end of the product pile in a generally vertical condition.

These and other objects and advantages, together with modifications thereof will be readily apparent to one of ordinary skill in the art without departing from the scope of the present invention, and applicant intends to be bound only by the claims appended hereto.

We claim:

1. A method for handling particulate product in an elongated horizontal bin comprising the steps of:
   depositing particulate product from a product feeding location proximate the upper end of a travelling product dam onto an elongated bin apron between a moveable end gate and said dam;
   indexing the dam and product feeding location away from the moveable end gate while continuing said depositing to fill the bin;
   supporting the end faces of the particulate product pile in the bin during filling in substantially vertical orientation, and
   discharging particulate product from the bin in a discharge cycle by advancing the apron toward the moveable end gate while at the same time supporting the trailing end face of the particulate product pile with the dam, opening the end gate to define a discharge outlet and producing a constant particulate product discharge through the discharge cycle.

2. A method as in claim 1 including the step of vibrating said apron during at least one of said depositing and discharging steps.

3. A method as in claim 1 including urging said particulate product pile against said gate to open said gate against a predetermined closing bias.

4. A method as in claim 1 including sensing the height of said product pile and indexing said dam away from said gate in response to said sensing.

5. A method as in claim 1 including the depositing steps of dropping product onto said dam and sliding product down a face of said dam to product piled in said bin.

6. A method as in claim 5 for initial filling of said bin including the steps of dropping product onto a tapered face of said dam, sliding product to an end of said face and thereafter dropping product from an end of said tapered face onto said apron between said dam and said gate.

7. A method as in claim 1 including the step of filling said bin while moving said apron to discharge product therefrom.

8. A method as in claim 7 including the steps of indexing said dam in a direction during said filling to maintain support of the trailing end face of the discharging product pile.

9. A method for depositing particulate product onto a moveable apron in an elongated horizontal bin and for discharging particulate product therefrom including the steps of:
   depositing particulate product onto said apron between first and second travelling dams, at one end of said bin,
   moving a first dam away from said one end while moving said apron in the same direction and while depositing particulate product,
   supporting end faces of an accumulation of said particulate product with said dams in a generally vertical orientation; and
   discharging particulate product from said bin by moving said first dam away from said apron to permit discharging product therebetween while moving said apron and said second dam toward said first dam.

10. A method of depositing particulate product onto a moveable apron in an elongated horizontal bin, including the steps of:
    depositing product onto a conveyor carried by a shuttle mounted for reciprocable movement over and along said bin,
    running said conveyor in a first direction and depositing product therefrom between an end gate at a discharge end of said bin and a travelling dam moveable independently of said shuttle,
    indexing said shuttle and said dam away from said gate and filling a first portion of said bin,
    thereafter, stopping said conveyor, moving said shuttle to a position proximate said end gate and reversing said conveyor to deposit product thereon into said bin between said end gate and said dam, and
    indexing said shuttle and said dam further away from said gate to fill a second portion of said bin,
    said dam maintaining and supporting a rear face of product in a generally vertical orientation.

11. A method as in claim 25 including discharging product from said bin by the steps of:
    moving said apron toward the discharge end of said bin,
    opening a space between said end gate and said apron,
    moving said dam toward the discharge end of said bin in coordination with said apron, and
    supporting the rear face of said product with said dam throughout said discharging.

12. A method as in claim 10 including maintaining said shuttle within the length confines of said bin during filling of both said first and second portions thereof.

13. A method as in claim 10 including filling said bin while discharging product therefrom including moving said shuttle and said conveyor to a position and in a direction to deposit product into said bin proximate said dam, and
    moving said dam in a direction to accommodate filling product while at the same time supporting a rear face of product in said bin.

14. A method as in claim 10 including depositing product onto said conveyor from a position located centrally between ends of said bin, and above said conveyor.

UNITED STATES PATENT AND TRADEMARK OFFICE
CERTIFICATE OF CORRECTION

PATENT NO. : 5,040,941
DATED : August 20, 1991
INVENTOR(S) : Edwin L. Wilding et al.

It is certified that error appears in the above-indentified patent and that said Letters Patent is hereby corrected as shown below:

Column 14, line 21, "claim 25" should be -- claim 10 --.

Signed and Sealed this

First Day of November, 1994

Attest:

BRUCE LEHMAN

Attesting Officer     Commissioner of Patents and Trademarks